US012025480B2

(12) United States Patent
Kasai et al.

(10) Patent No.: US 12,025,480 B2
(45) Date of Patent: Jul. 2, 2024

(54) THERMAL FLOW SENSOR CHIP (71) Applicant: MMI SEMICONDUCTOR CO., LTD., Tokyo (JP)

(72) Inventors: Takashi Kasai, Kyoto (JP); Koji Momotani, Kyoto (JP)

(73) Assignee: MMI SEMICONDUCTOR CO., LTD., Tokyo (JP)

( * ) Notice: Subject to any disclaimer, the term of this patent is extended or adjusted under 35 U.S.C. 154(b) by 192 days.

(21) Appl. No.: 17/904,508

(22) PCT Filed: Dec. 16, 2020

(86) PCT No.: PCT/JP2020/047056
§ 371 (c)(1),
(2) Date: Aug. 18, 2022

(87) PCT Pub. No.: WO2021/166401
PCT Pub. Date: Aug. 26, 2021

(65) Prior Publication Data
US 2023/0113770 A1   Apr. 13, 2023

(30) Foreign Application Priority Data
Feb. 21, 2020   (JP) ................. 2020-028664

(51) Int. Cl.
*G01F 1/688*   (2006.01)
*G01F 1/692*   (2006.01)
(Continued)

(52) U.S. Cl.
CPC ............ *G01F 1/6888* (2013.01); *G01F 1/692* (2013.01)

(58) Field of Classification Search
CPC .......... G01F 1/6888; G01F 1/692; G01F 1/69; G01P 5/10
See application file for complete search history.

(56) References Cited

U.S. PATENT DOCUMENTS

| 6,684,694 B2 | 2/2004 | Fujiwara et al. |
| 2004/0118202 A1 | 6/2004 | Iwaki et al. |

(Continued)

FOREIGN PATENT DOCUMENTS

| CN | 110146136 A | * | 8/2019 | ........... G01F 1/6888 |
| EP | 3404373 | | 11/2018 | |

(Continued)

OTHER PUBLICATIONS

International Search Report of Int. Appl. No. PCT/JP2020/047056 dated Feb. 2, 2021.

*Primary Examiner* — Peter J Macchiarolo
*Assistant Examiner* — Anthony W Megna Fuentes
(74) *Attorney, Agent, or Firm* — IPUSA, PLLC (57) ABSTRACT A thermal flow sensor chip has a heater part, and a pair of thermopiles provided so as to be opposite each other across the heater part. The heater part is famed by doping silicon with an impurity that reduces the electrical resistance. In each of the thermopiles: a silicon region is formed by doping silicon with an impurity that reduces the electrical resistance; the concentration of the impurity in a heater main part, including the lengthwise center of the heater part extending in the first direction, is lower than the concentration of the impurity in a heater outer peripheral part, the heater outer peripheral part being different from the heater main part and including a lengthwise end part of the heater part; and the concentration of the impurity in the heater main part is the same as the concentration of the impurity in at least part of the silicon region of the thermopile.

10 Claims, 6 Drawing Sheets (51) Int. Cl.
*G01F 1/69* (2006.01)
*G01P 5/10* (2006.01)

(56) References Cited

U.S. PATENT DOCUMENTS

2008/0044939 A1* 2/2008 Nassiopoulou ........ G01K 7/028
  438/54
2017/0345987 A1* 11/2017 Nakano ................ G01F 15/022

FOREIGN PATENT DOCUMENTS

| | | |
|---|---|---|
| JP | H08-122118 | 5/1996 |
| JP | H11-083580 | 3/1999 |
| JP | 2004-233143 | 8/2004 |
| JP | 3658321 | 6/2005 |

\* cited by examiner

THERMAL FLOW SENSOR CHIP

TECHNICAL FIELD

This invention relates to a flow sensor chip.

BACKGROUND ART

A thermal flow sensor chip that forms a heater and a temperature sensing element by providing a thin film part on a semiconductor substrate such as silicon (Si) and doping the thin film part with impurities is conventionally known (see Patent Document 1, for example).

Patent Document 1 discloses having a thermal air flow sensor with improved air temperature dependence and mechanical strength by: constituting a heating resistor and a resistance temperature detector by a doped semiconductor thin film by forming the heating resistor and the temperature measurement resistor on a semiconductor substrate via an electrical insulating film; making the impurity concentration of the heating resistor greater than that of the resistance temperature detector; and furthermore, supporting and reinforcing the electrical insulating film above the cavity that is provided underneath the electrical insulating film, by beam-like supporting parts protruding from the periphery of the cavity, where the semiconductor substrate is doped with impurities to a predetermined depth.

Furthermore, Patent Document 2 discloses a thermal flow sensor, in which: a heater wire is formed on a substrate; the heater wire has a constricted part in its intermediate part for partially increasing the resistance value so as to create a pin-point heat generating point; and, furthermore, a hollow part for thermal insulation is formed in the substrate portion located below the vicinity of the constricted part.

Also, Patent Document 3 discloses a thermal flow sensor, in which: in a semiconductor film where a resistor such as a heater and a lead part, which is a wire connected to the resistor to supply current thereto, are formed, at least the region forming the resistor is locally thin-filmed.

RELATED-ART DOCUMENTS

Patent Documents

Patent Document 1: Unexamined Japanese Patent Application Publication No. HEI11-83580
Patent Document 2: Unexamined Japanese Patent Application Publication No. HEI8-122118
Patent Document 3: Unexamined Japanese Patent Application Publication No. 2004-233143

SUMMARY OF THE INVENTION

Problem to be Solved by the Invention

Generally, with this type of flow sensor chip, it is desirable for the heater to generate heat (at a high temperature) near the center of the thin film, so as to suppress the radiation of heat from the outer edges of the heater to the surroundings, the substrate, and so forth. Given this configuration, the conduction of heat from other parts of the heater, including the ends of the heater (hereinafter also referred to as "outer peripheral parts of the thin film") to the substrate and the like is suppressed, thereby increasing the heat generation temperature of the heater even with the same electric power, and therefore the sensitivity of the sensor can be increased, and the power consumption can be reduced.

To allow the heater to generate heat in the vicinity of the center part of the thin film, the resistance of the heater in parts near the center part of the thin film part should be made higher than the resistance in the outer peripheral parts of the thin film. The method for this might include, for example, as described in Patent Document 2, making the wire width in the center part of the heater relatively narrower than in the outer peripheral parts of the thin film, thereby increasing the resistance in the vicinity of the center part. It is also conceivable to apply the technique described in Patent Document 3, whereby the part constituting a resistor is partially formed with a thin film, to the center part of a heater.

However, when the wire width in the center part of a heater is made narrow, the area of the heater in that part is reduced, and therefore the amount of heat radiation to the atmosphere is also reduced, leading to a decrease in sensor sensitivity. Also, since the current density becomes higher in the narrowed part, the risk of disconnection increases. Also, since it is necessary to widen the wire width in the outer peripheral parts of the thin film, the heater's heat is likely to escape (is easily conducted) to the substrate from those parts. Also, there is a limit to how thin the line width can be, and so significant improvement in resistance cannot be expected. For this reason, the method of narrowing the wire width in the center part of a heater is not very effective in improving heat generation efficiency.

Also, with the method of thinning the thickness of thin film in the center part of a heater, a technique such as making that part thin by surface etching may be used, but there is a concern that the characteristics will vary depending on the variation in the depth of etching. Also, since an additional etching step is necessary, the cost of manufacturing might increase.

One aspect of the present invention has been made in view of the foregoing circumstances, and therefore provides a technique for overcoming the above-describe problems with the related art, and realize high sensitivity and low power consumption of a thermal flow sensor.

Means for Solving the Problem

The present invention employs the following configurations in order to solve the above-described problems with the related art.

A thermal flow sensor chip according to the present invention has: a substrate part; a thin film part provided on the substrate part; a heater part provided on the thin film part and extending in a first direction; and a pair of thermopiles provided on the thin film part and arranged opposite each other across the heater part. The heater part is famed by doping silicon with an impurity that reduces the electrical resistance. In each of the thermopiles: a silicon region is famed by doping silicon with an impurity that reduces the electrical resistance; and a plurality of thermocouples are arrayed in the first direction, each thermocouple having a hot junction arranged closer to the heater part and a cold junction arranged farther from the heater part. The concentration of the impurity in a heater main part, including the lengthwise center of the heater part extending in the first direction, is lower than the concentration of the impurity in a heater outer peripheral part, the heater outer peripheral part being different from the heater main part and including a lengthwise end part of the heater part. The concentration of the impurity in the heater main part is the same as the concentration of the impurity in at least part of the silicon region of the thermopile.

Note that the thermopile here refers to a combination of a plurality of thermocouples, which are temperature sensors that utilize what is known as the Seebeck effect. As in the above configuration, if the concentration of impurities in the main part of the heater, including the vicinity of the center part of the heater, is lower than the concentration of impurities in the outer peripheral parts of the heater, the resistance value of the heater main part can be improved significantly compared to the case of changing the wire width, the film thickness, and so forth. Also, since it is not necessary to increase the wire width of the heater located in the outer peripheral parts of the thin film, the conduction of heat to the substrate through the wire itself can be reduced.

Then, when the impurity concentration in the heater main part, where the resistance is relatively high, and the impurity concentration in the silicon region of the thermopile are the same, this means that the resistance of the silicon constituting the thermopile is also relatively high, and that the thermopile's Seebeck coefficient increases. The Seebeck coefficient is a coefficient that expresses the sensitivity of a thermocouple (magnitude of voltage to temperature). As the Seebeck coefficient increases, a thermopile's sensitivity performance improves. Note that, in semiconductor processing, parts of the same density/concentration can be formed all at once even if these parts are located separately from each other, and so there is no increase in the number of man-hours in manufacturing.

Also, the type of the impurity that is doped may be the same between the heater main part and the heater outer peripheral part. Given this configuration, it is possible to overcome the problems that surface when parts of different impurities (materials) are used, such as reduced reliability, increased number of manufacturing steps, deterioration in durability, and so forth.

Also, the impurity may be at least one of phosphorus, arsenic, and boron.

Also, the boundary between the heater main part and the heater outer peripheral part is provided within a predetermined distance from a reference location, the reference location being the location where a straight line that extends in a second direction from an end part of the thermopile in the first direction intersects the heater part, the first direction and the second direction being perpendicular to each other on a horizontal plane.

Here, the end part of the thermopile in the first direction is synonymous with the outer end part of the outermost thermocouple among the plurality of thermocouples constituting the thermopile. According to the configuration described above, it is possible to provide the main part, where the heater has a high resistance, at a suitable location in view of the positional relationship with the thermopile.

Also, the predetermined distance may be the same as the average distance from the heater part to the hot junction. In the absence of fluid flow, the heat generated by the heater is likely to propagate isotropically, so that, by defining the boundary between the heater main part and the heater outer peripheral part in this way, an efficient configuration can be provided, taking into account the balance between the heat generation efficiency of the heater and the output of the thermopile.

Also, in the silicon region of the thermopile: the concentration of the impurity may vary between thermopile junction parts and thermopile wire parts, the thermopile junction parts including the hot junction and the cold junction, and the thermopile wire parts being different from the thermopile junction parts and including a wiring region between the hot junction and the cold junction; and the concentration of the impurity in the heater main part may be the same as the concentration of the impurity in the thermopile junction parts. Also, the concentration of the impurity in the heater outer peripheral parts may be the same as the concentration of the impurity in the thermopile wire part.

A thermopile is an element that detects the temperature difference between a hot junction and a cold junction. Because the thermopile must be long enough to ensure temperature difference, the wiring tends to be long, and what is known as parasitic resistance tends to increase. When the parasitic resistance increases, it becomes a noise source due to the thermal noise of resistors, which then leads to degradation of sensitivity performance. In this respect, with the above-described configuration, the resistance of the thermopile wire part (silicon wiring) becomes relatively low, so that the parasitic resistance of silicon wires can be suppressed. Note that, with this configuration, although the Seebeck coefficient of the thermopile is partially reduced, the resistance of silicon wires in regions where the temperature varies little is selectively reduced, so that it is possible to reduce the noise efficiently while suppressing the decrease of sensitivity performance.

On the other hand, in the silicon region of the thermopile, the concentration of the impurity may vary between thermopile junction parts and thermopile wire parts, the thermopile junction parts including the hot junction and the cold junction, and the thermopile wire parts being different from the thermopile junction parts and including a wiring region between the hot junction and the cold junction, and the concentration of the impurity in the heater main part may be the same as the concentration of the impurity in the thermopile wire parts. Also, the concentration of the impurity in the heater outer peripheral parts may be the same as the concentration of the impurity in the thermopile junction parts.

With a thermopile, it is common to achieve high sensitivity by reducing the size of each element and increasing the number of thermocouples that constitute the thermopile. Moreover, since a thermopile's junction parts are contact portions made of a different material, the parasitic resistance tends to increase. In this regard, with the above-described configuration, it is possible to form ohmic contacts at the thermopile's junction parts, and suppress the contact-induced parasitic resistance. That is, the noise can be reduced by lowering the resistance of junction parts while maintaining the sensitivity performance. Furthermore, by lowering the impurity concentration of wire parts while keeping the contact resistance low, it is possible to improve the sensitivity performance while ensuring ohmic contacts.

Also, the concentration of the impurity in the heater outer peripheral parts may be at least three times the concentration of the impurity in the heater main part. The greater the difference in impurity concentration between the heater main part and heater outer peripheral parts, the greater the difference in resistance value. Nevertheless, this configuration is suitable for producing sufficient resistance value differences.

Effects of the Invention

According to this invention, it is possible to provide a technique for achieving high sensitivity and low power consumption of a thermal flow sensor, while overcoming conventional problems.

MODE OF CARRYING OUT THE INVENTION

Now, an embodiment according to one aspect of the present invention (hereinafter also referred to as "the present embodiment") will be described below with reference to the accompanying drawings. However, the present embodiment described below is simply an example of the present invention in all respects. It is obvious that various modifications and variations can be made without departing from the scope of the present invention. That is, in carrying out the present invention, specific configurations may be employed as appropriate in accordance with the embodiment.

Embodiment 1

Figure 1:
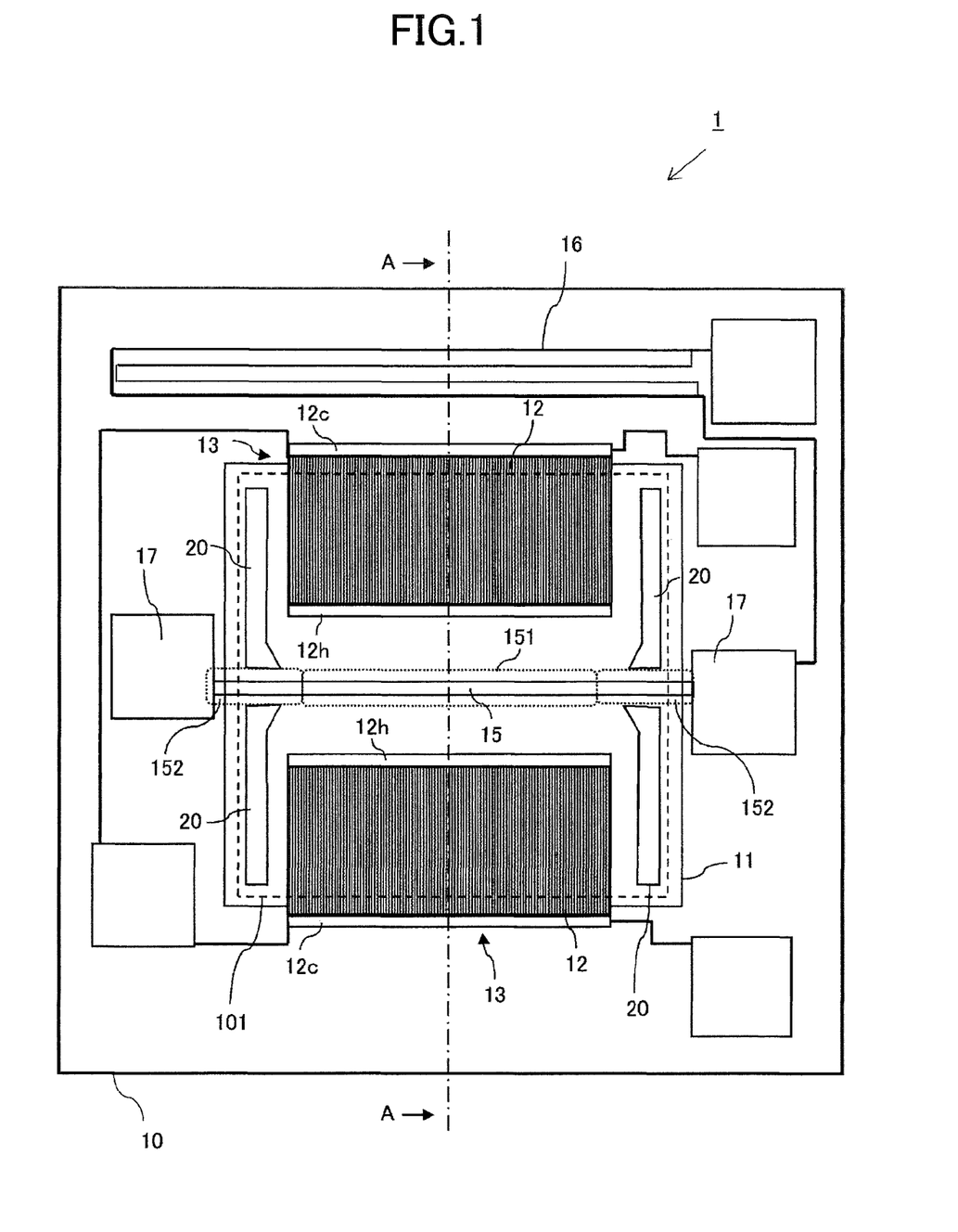
FIG. 1 is a diagram schematically showing an overview of a flow sensor chip according to an embodiment 1.
Figure 2:
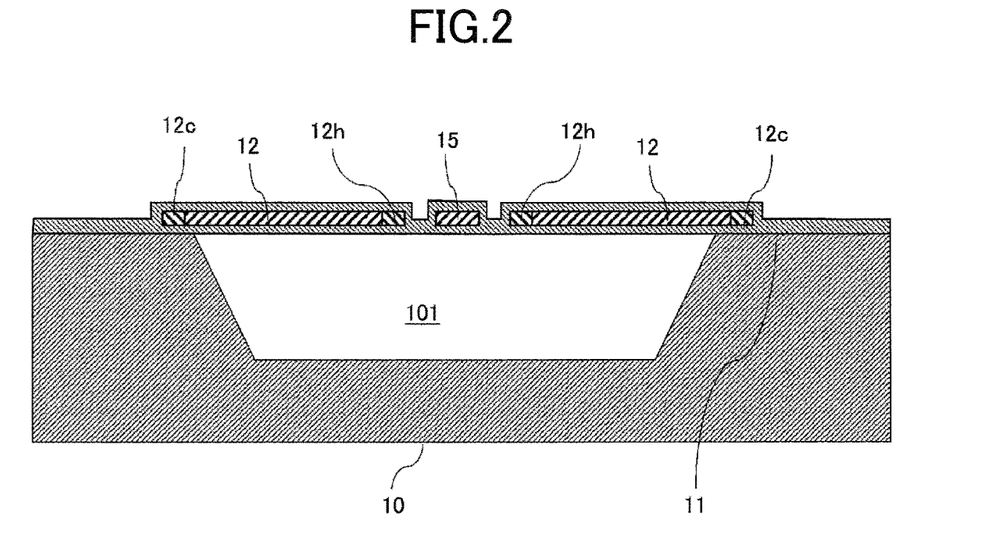
FIG. 2 is a diagram partially showing a cross-section of the flow sensor chip according to embodiment 1.

FIG. 1 shows a plan view of a flow sensor chip 1 according to a first embodiment of the present invention. Note that, hereinafter, the horizontal direction in FIG. 1 will be referred to as "the first direction," and the vertical direction in FIG. 1 will be referred to as "the second direction." Also, FIG. 2 is a diagram schematically showing an A-A cross section in FIG. 1. Note that no temperature sensor 16 is illustrated in FIG. 2.

Figure 3:
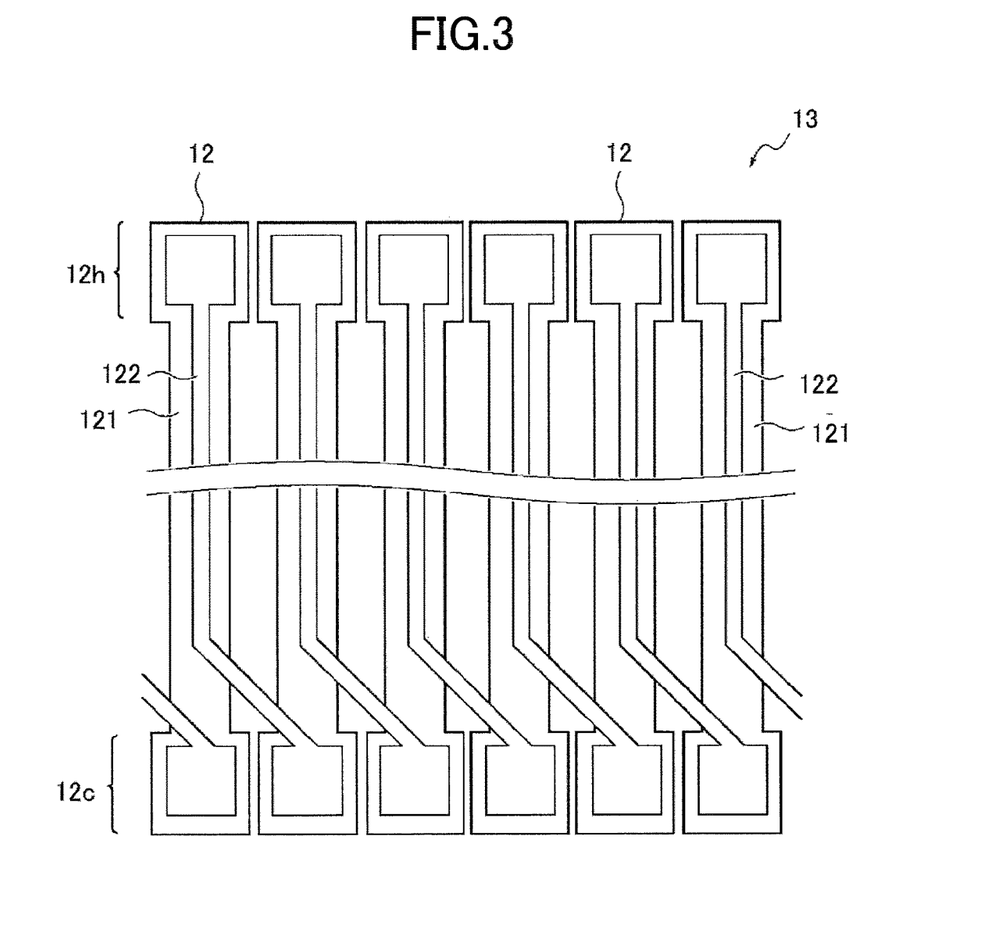
FIG. 3 is a diagram schematically showing a configuration of a thermopile in the flow sensor chip according to embodiment 1.

As shown in FIG. 1 and FIG. 2, a flow sensor chip 1 according to the present embodiment is a sensor chip, in which a thin film-like part 11 is provided on a substrate part 10 having a cavity 101 opening on the upper surface. The thin film-like part 11 has two thermopiles 13. Each thermopile 13 of the flow sensor chip 1 according to the present embodiment is formed by connecting a plurality of thermocouples 12 as shown in FIG. 3. Also, each thermopile 13 employs N-type polysilicon (silicon into which phosphorus is ion-implanted) and Al (aluminum) as constituent materials of a first wire 121 and a second wire 122 of each thermocouple 12, respectively.

Each thermopile 13 in the thin film-like part 11 is famed such that the hot junctions 12h of a plurality of thermocouples 12 are arranged in the first direction (the horizontal direction in FIG. 1). Also, each thermopile 13 is formed such that a plurality of cold junctions 12c are provided at locations on the substrate part 10 avoiding the cavity 101, and a plurality of hot junctions 12h of each thermopile 13 face each other. Note that the temperature sensor 16 of FIG. 1 is a resistance temperature sensor for measuring the reference temperature for use as the temperature of the cold junction 12c of each thermopile 13.

The thin film-like part 11 also has a heater part 15, which is provided between the two thermopiles 13 and which extends in the first direction. The heater part 15 is composed of a heater main part 151 and heater outer peripheral parts 152. The heater main part 151 includes the center of the heater part in the lengthwise direction. The heater outer peripheral parts 152 are parts other than the heater main part, and includes the lengthwise end parts of the heater part. Also, two electrode pads 17, between which a voltage is applied when the heater part 15 is energized, are provided on the substrate 10.

In the region above the cavity 101 of the thin film-like part 11, in the region on the outside with respect to the right-hand end of the two thermopiles 13 in FIG. 1, two through holes 20 are provided. Similarly, in the region above the cavity 101 of the thin film-like part 11, in the region on the outside with respect to the left-hand end of the two thermopiles 13 in FIG. 1, two through holes 20 are provided. These through holes 20 function as inlets for the etchant on the substrate part 10 side when the flow sensor chip 1 is manufactured, and function as a configuration for reducing the amount of heat that outflows from the heater part 15 while the flow sensor chip 1 is in use.

The heater part 15 and the first wires 121 of the thermocouples 12 that constitute the thermopiles 13 are given predetermined conductivity by ion-implanting impurities into silicon in the manufacturing process. Phosphorus (P) is ion-implanted as an impurity in the flow sensor chip 1 of the present embodiment. Hereinafter, ion-implantation of impurities into silicon will be also referred to as "doping."

Then, the concentration of P varies between the heater main part 151 and the heater outer peripheral parts 152, and the P concentration in the heater outer peripheral parts 152 is higher than the P concentration in the heater main part 151. To be more specific, for example, the P concentration in the heater outer peripheral parts 152 is $3 \times 10^{20}$ (cm$^{-3}$), and the P concentration in the heater main part 151 is $6 \times 10^{19}$ (cm$^{-3}$). By this means, while the sheet resistance of silicon is approximately 14 Ω/sq. in the heater outer peripheral parts 152, the heater main part 151 has a high sheet resistance such as approximately 30 Ω/sq.

Also, the concentration of P in the first wire 121 of the thermocouple 12 is $6 \times 10^{19}$ (cm$^{-3}$), which is the same as the P concentration in the heater main part 151. The fact that the P concentration in the first wire 121 is the same as the P concentration in the heater main part 151, which is lowered so as to increase the resistance, means that the Seebeck coefficient of the thermopiles 13 is increased. The Seebeck coefficient is a coefficient that expresses the sensitivity of a thermocouple (the magnitude of voltage to temperature), and so it is possible to say that the higher the Seebeck coefficient, the better the sensitivity performance of the thermopile. Also, having the same impurity concentration means that the heater main part 151 and the first wire 121 can be famed in the same manufacturing process.

Figure 4:
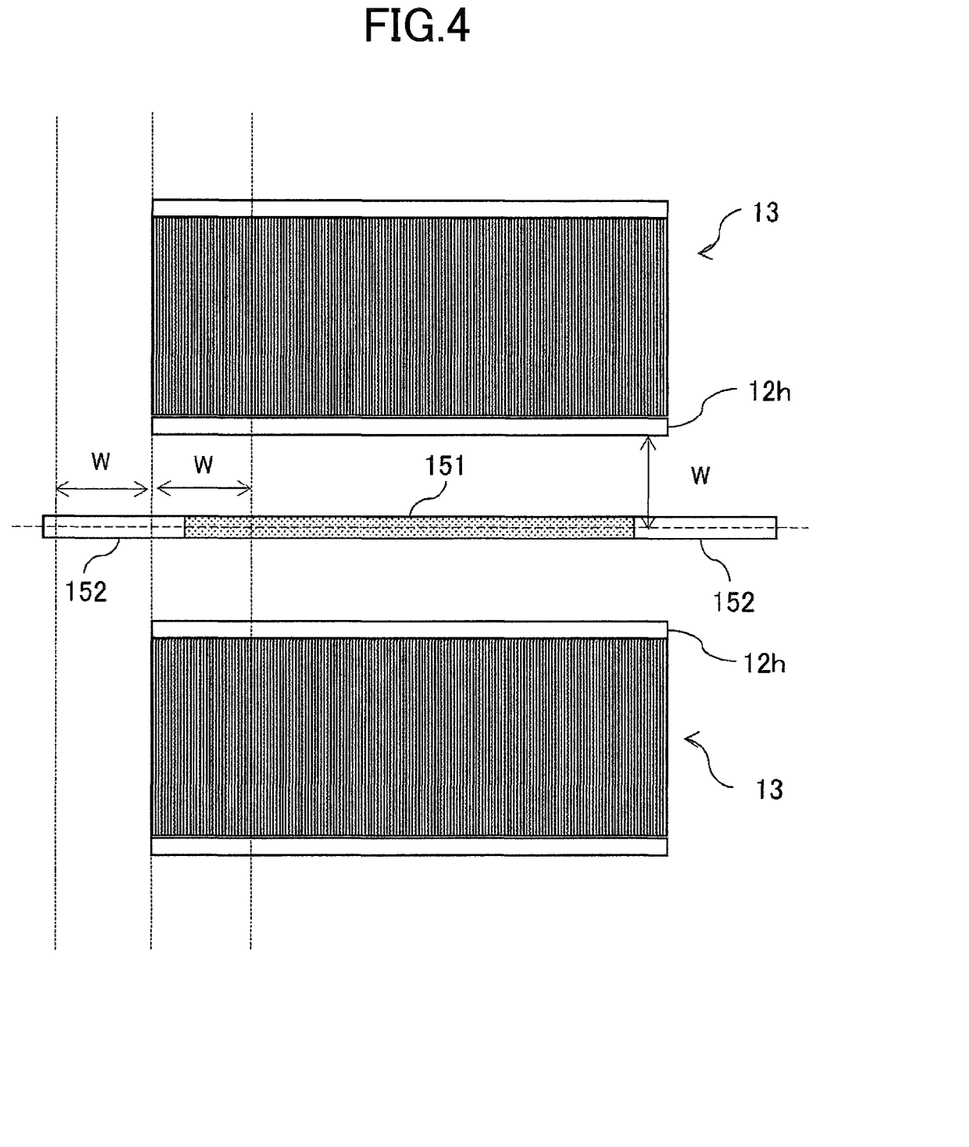
FIG. 4 is a diagram schematically showing a positional relationship between thermopiles and a heater part in the flow sensor chip according to embodiment 1.

Next, the boundary positions between the heater main part 151 and the heater outer peripheral parts 152 in the heater part 15 will be described with reference to FIG. 4. FIG. 4 is a diagram schematically showing the positional relationship between the thermopiles 13 and the heater part 15. "W" in FIG. 4 indicates the average distance between the heater part 15 and the hot junctions 12h of the thermopiles 13. As shown in FIG. 4, the boundaries between the heater main part 151 and the heater outer peripheral parts 152 are located within distance W from the end parts of the thermopiles 13 in the first direction, and on the inside with respect to the end parts of the thermopiles 13 in the first direction.

The positional relationship described above makes it difficult for the heat of the heater main part 151 to transmit to the substrate side, so that the power efficiency can be improved. However, the temperature at the end parts of the thermopiles 13 in the first direction becomes relatively low, and the output from the thermopiles 13 becomes small.

Next, an example of the manufacturing process of the flow sensor chip 1 will be described. When manufacturing the flow sensor chip 1, first, a silicon oxide film ($SiO_2$ film, not shown) is formed on the surface of a single-crystal silicon substrate (hereinafter simply referred to as the "substrate") that serves as a substrate part 10. Next, the portion that serves as the opening of the cavity 101 is removed from the $SiO_2$ film. Subsequently, a sacrificial layer (not shown) having the same top view shape as the opening of the cavity 101 is famed by using polysilicon on the substrate 10.

Next, $SiO_2$ is deposited so as to cover the sacrificial layer. Subsequently, a silicon nitride film (SiN film, not shown), an $SiO_2$ film, and an N-type polysilicon film (not shown) are formed, in this order, on the $SiO_2$ film that is then thick enough to cover the sacrificial layer. Note that foaming an N-type polysilicon film means forming a polysilicon film first and then implanting P ions into the polysilicon film.

Although the first wire 121 and heater part 15 of each thermocouple 12 are formed by patterning the N-type polysilicon film, here, ions are implanted such that the concentration of P varies between the heater main part 151 and the heater outer peripheral parts 152.

After the heater part 15 and the like are formed, an insulating film (not shown) is famed, and then contact openings are formed in various places in the insulating film. Then, Al foams the second wire 122 of each thermocouple 12.

After the second wire 122 and the like are foamed, an $SiO_2$ film and an SiN film are formed. Also, all the electrode pads including the electrode pads 17, and metal wires are formed by using Au and the like. After the through holes 20 are formed, the cavity 101 is formed by partially removing the sacrificial layer and the substrate 10 with an etchant such as TMAH (tetramethylammonium hydroxide).

As described above, the flow sensor chip 1 according to the present embodiment is constituted by a heater main part 151 including the center of a heater part 15 and heater outer peripheral parts 152 including the end parts of the heater part 15, and the concentration of impurities in the heater main part 151 is lower than in the heater outer peripheral parts 152. As a result of this, the resistance value of the heater main part 151 can be significantly improved, and the power consumption for generating heat can be reduced, compared to the case where the wire width, the film thickness, and so forth of the heater main part 151 are changed. Also, since the resistance of the heater outer peripheral parts 152 can be reduced, deterioration of characteristics due to parasitic resistance and the like can be suppressed, and ohmic contacts can be secured easily at the electrode pads 17 and other contact portions of electrode wiring. Furthermore, it is not necessary to increase the wire width in the heater outer peripheral parts 152 located in the outer peripheral parts of the thin film, so that it is possible to reduce the conduction of heat to the substrate through the wiring itself and to suppress wasteful power consumption.

Also, the heater main part 151 and the heater outer peripheral parts 152 are made of silicon doped with the same type of impurity. Consequently, compared to the case of using different materials or doping with different types of impurities, the impact of thermal stress can be reduced, and the durability and reliability can be improved.

Furthermore, in the flow sensor chip 1 according to the present embodiment, the first wires 121 of the thermocouples 12 constituting the thermopiles 13 are made of P-doped silicon, and have the same P concentration as that of the heater main part 151. Therefore, the heater main part 151 and the first wires 121 can be formed in the same process. Also, silicon with high resistance tends to have a high Seebeck coefficient, which leads to improved temperature sensing performance of the thermopiles 13.

Modifications

Figure 5A:
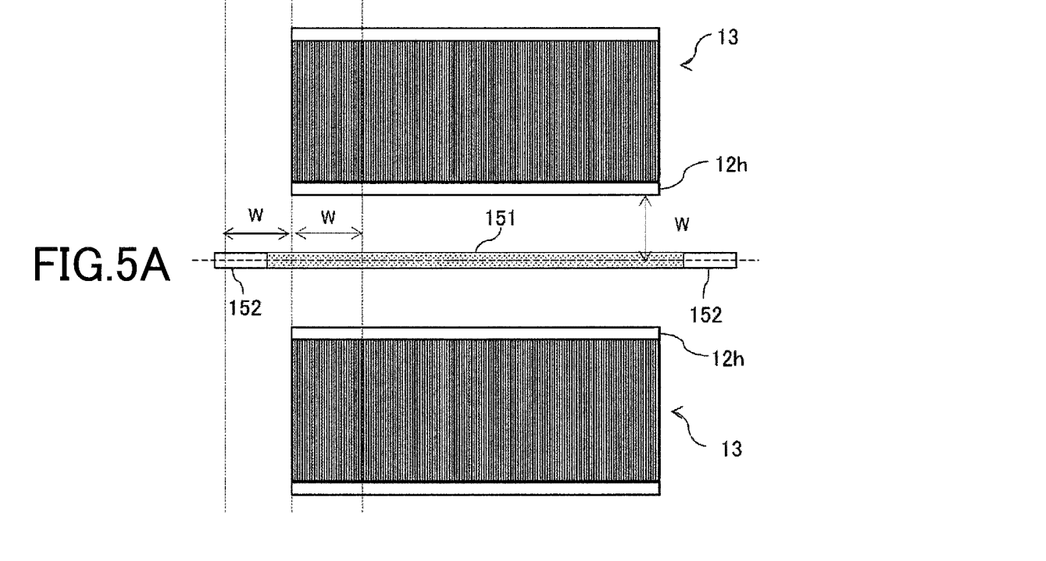
FIG. 5A is a diagram showing a first modification of the flow sensor chip according to embodiment 1.
Figure 5B:
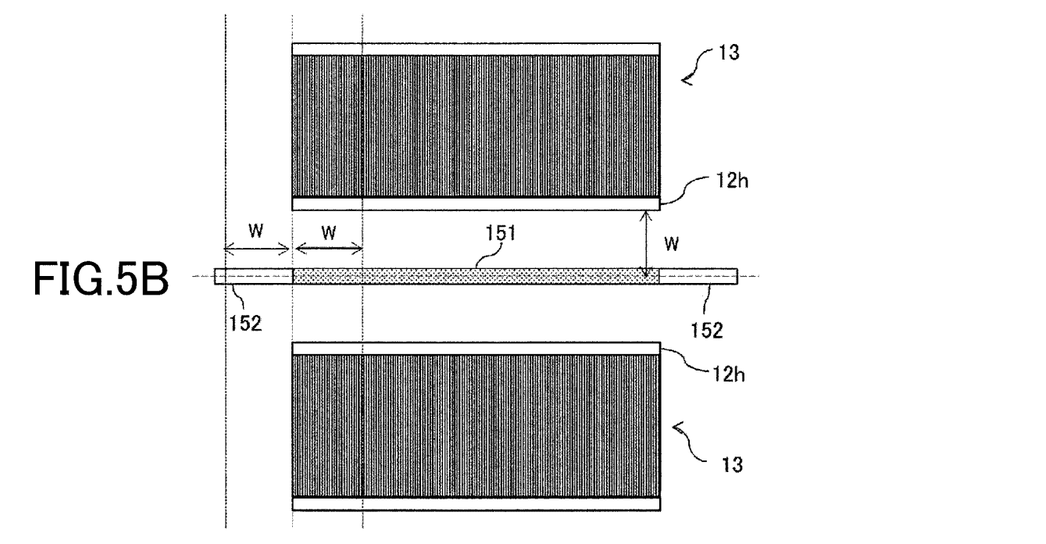
FIG. 5B is a diagram showing a second modification of the flow sensor chip according to embodiment 1.

Note that, in above embodiment 1, the boundary positions between the heater main part 151 and the heater outer peripheral parts 152 are located on the inside with respect to the end parts of the thermopiles 13 in the first direction, but these locations can be set flexibly. FIG. 5A and FIG. 5B show other example arrangements of boundaries between the heater main part 151 and the heater outer peripheral parts 152.

In the modification shown in FIG. 5A, the boundary positions between the heater main part 151 and the heater outer peripheral parts 152 are located within distance W from the end parts of the thermopiles 13 in the first direction and on the outside with respect to the end parts of the thermopiles 13 in the first direction. This arrangement allows sufficient heat to be transmitted to the end parts of the thermopiles 13 in the first direction, so that the output of the thermopiles 13 increases. However, since the heat of the heater part 15 transmits to the substrate side more easily, the power efficiency decreases.

In another modification shown in FIG. 5B, the end parts of the thermopiles 13 in the first direction and the boundary positions between the heater main part 151 and the heater outer peripheral parts 152 are aligned in the first direction. With this configuration, the advantages and disadvantage of the configuration of embodiment 1 shown in FIG. 4 and the configuration of the modification of FIG. 5A are averaged out.

Note that the boundary positions between the heater main part 151 and the heater outer peripheral parts 152 do not necessarily need to be set within distance W from the end parts of the thermopiles 13 in the first direction. However, such a configuration is still suitable because the heat generated in the heater part 15 is likely to propagate isotropically in the absence of fluid flow.

Second Embodiment

Figure 6:
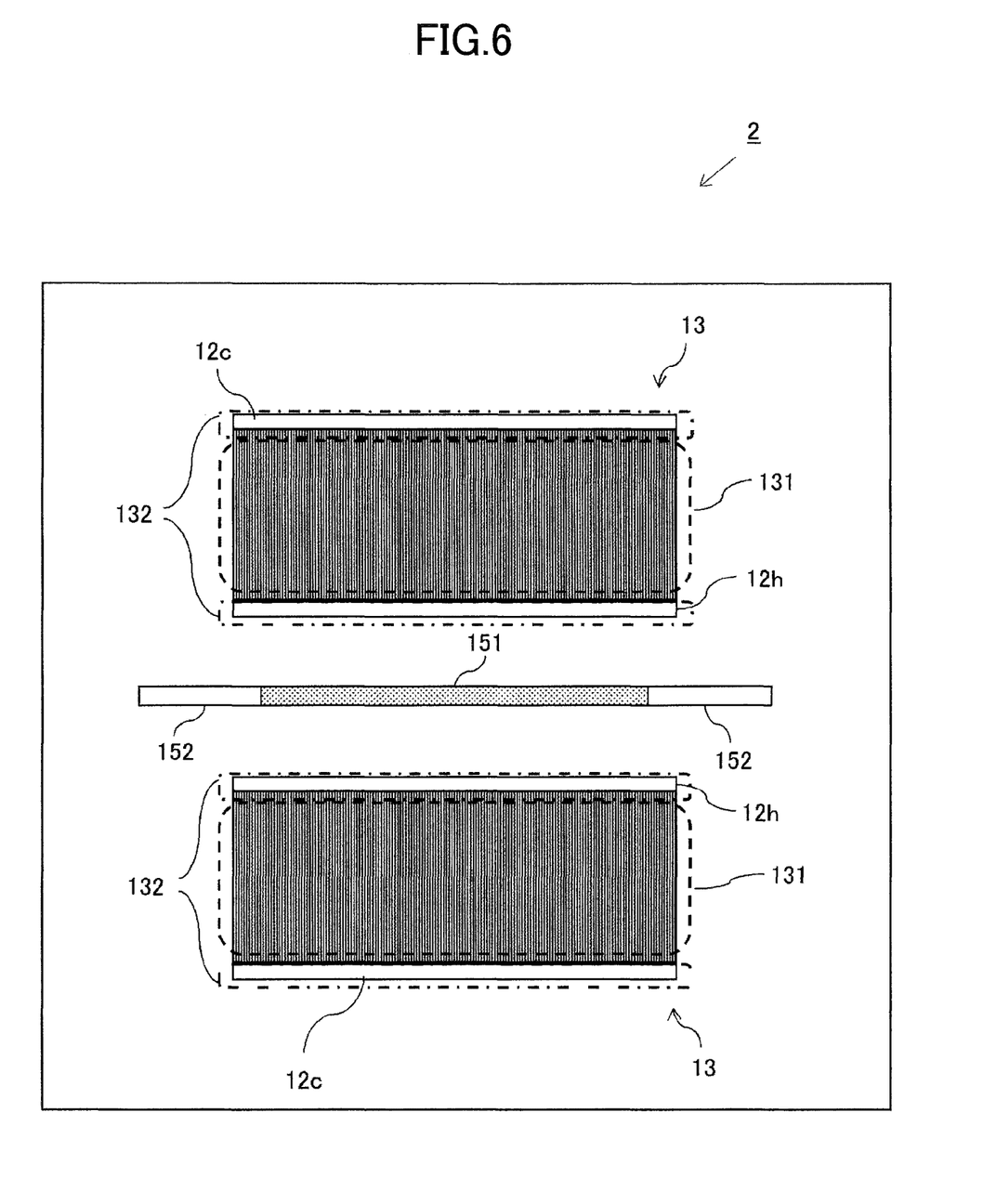
FIG. 6 is a diagram showing an overview of a flow sensor chip according to an embodiment 2.

Next, a flow sensor chip 2 according to a second embodiment of the present invention will be explained. The flow sensor chip 2 according to the present embodiment has substantially the same configuration as the flow sensor chip 1 according to embodiment 1. For this reason, the same reference numerals are used for configurations similar to those of the flow sensor chip 1, and only the parts different from the flow sensor chip 1 will be mainly described. FIG. 6 is a diagram schematically showing the thermopiles 13 and the heater part 15 of the flow sensor chip 2.

As shown in FIG. 6, each thermopile 13 of the flow sensor chip 2 has a thermopile wire part 131, including a wiring region between the hot junction 12h and the cold junction 12c, and a thermopile junction part 132, including the hot junction 12h or the cold junction 12c.

Then, in the flow sensor chip 2 according to the present embodiment, the P concentration in the first wire 121 of the thermopile wire part 131 is the same as the P concentration in the heater outer peripheral parts 152, and the P concentration in the first wire 121 of the thermopile junction part 132 is the same as the P concentration in the heater main part 151.

A thermopile is an element that detects the temperature difference between a hot junction and a cold junction. Because the thermopile must be long enough to ensure temperature difference, the wiring tends to be long, and what is known as parasitic resistance tends to increase. When the parasitic resistance increases, it becomes a noise source due to the thermal noise of resistors, which then leads to degradation of sensitivity performance.

In this respect, with the above-described configuration, the resistance of the thermopile wire part 131 can be made relatively low, so that the parasitic resistance can be suppressed. Note that, with this configuration, although the Seebeck coefficient of the thermopile is partially reduced, the resistance of silicon wires in regions where the temperature varies little is selectively reduced, so that it is possible to reduce the noise efficiently while suppressing the decrease of sensitivity performance.

Also, given that the thermopile wire part 131 (the first wire 121 thereof) and the heater outer peripheral parts 152 have the same P concentration, and the thermopile junction part 132 (the first wire 121 thereof) and the heater main part 151 have the same P concentration, such a configuration does not increase the number of manufacturing processes.

Modifications

Note that, in the flow sensor chip 2, the P concentration may be reversed between the thermopile wire part 131 and the thermopile junction part 132. That is, the P concentration in the first wire 121 of the thermopile wire part 131 may be the same as the P concentration in the heater main part 151, and the P concentration in the first wire 121 of the thermopile junction part 132 may be the same as the P concentration in the heater outer peripheral parts 152.

With a thermopile, it is common to achieve high sensitivity by reducing the size of each element and increasing the number of thermocouples that constitute the thermopile. Moreover, since a thermopile's junction parts are contact portions made of a different material, the parasitic resistance tends to increase. In this regard, with the above-described configuration, it is possible to form ohmic contacts at the thermopile's junction parts, and suppress the contact-induced parasitic resistance. That is, the noise can be reduced by lowering the resistance of junction parts while maintaining the sensitivity performance. Furthermore, by lowering the impurity concentration of wire parts while keeping the contact resistance low, it is possible to improve the sensitivity performance while ensuring ohmic contacts.

Others

Figure 7:
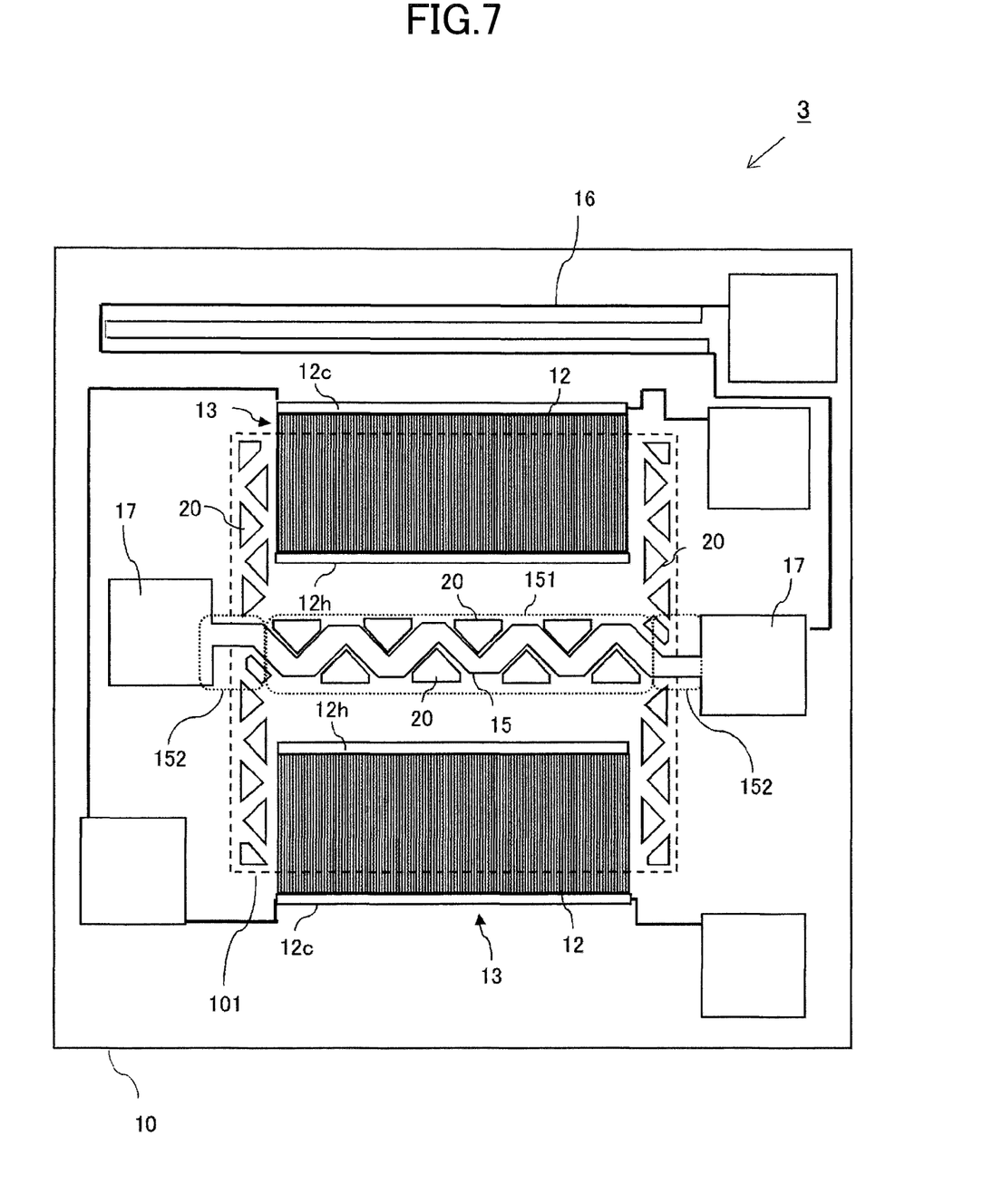
FIG. 7 is a diagram schematically showing a modification in which the shape of the heater part is different.

The flow sensor chips 1 and 2 described above can be modified in a variety of ways. For example, in each of the above examples, the shape of the heater part 15 was linear, but the shape of the heater part is not necessarily limited to this. FIG. 7 shows a schematic top view of the flow sensor chip 3 in which the heater part 15 assumes a different shape. As shown in FIG. 7, in the flow sensor chip 3 according to this modification, a plurality of triangular through holes 20 are provided about the center part of the thin film-like part, and the heater part 15 extends meandering between the through holes 20. Also, although not shown, the shape of the heater main part 151 in the flow sensor chip of each embodiment may be a bent shape like a rectangular wave.

Also, in the flow sensor chips 1 and 2 of each embodiment, a thermopile in which two adjacent thermocouples 12 are connected by a contact and a conductive member may be employed. Also, for the flow sensor chips 1 and 2, a thermopile in which the first wire 121 and the second wire 122 are not laminated may be employed.

Also, in the flow sensor chips 1 and 2 of each embodiment described above, the impurity to be doped is P, but the impurity to be doped is not necessarily limited to this. For example, boron (B), arsenic (AS), and so forth may be employed.

Also, the impurity concentrations in the heater main part 151 and the heater outer peripheral parts 152 are not limited to those described in the above embodiments, and can be set flexibly as long as the impurity concentration in the heater main part 151 is lower than the impurity concentration in the heater outer peripheral parts 152. However, to produce sufficient resistance value differences between the heater main part 151 and the heater outer peripheral parts 152, it is desirable to make the impurity concentration difference three times or more.

Appended Clause

A thermal flow sensor chip (1; 2; 3) has: a substrate part (10); a thin film part (11) provided on the substrate part; a heater part (15) provided on the thin film part and extending in a first direction; and a pair of thermopiles (13) provided on the thin film part and arranged opposite each other across the heater part. The heater part is formed by doping silicon with an impurity that reduces the electrical resistance. In each of the thermopiles: a silicon region (121) is formed by doping silicon with an impurity that reduces the electrical resistance; and a plurality of thermocouples (12) are arrayed in the first direction, each thermocouple having a hot junction (12h) arranged closer to the heater part and a cold junction (12c) arranged farther from the heater part. The concentration of the impurity in a heater main part (151), including the lengthwise center of the heater part extending in the first direction, is lower than the concentration of the impurity in a heater outer peripheral part (152), the heater outer peripheral part being different from the heater main part and including a lengthwise end part of the heater part. The concentration of the impurity in the heater main part is the same as the concentration of the impurity in at least part of the silicon region of the thermopile.

DESCRIPTION OF THE REFERENCE NUMERALS 1, 2, 3 . . . flow sensor chip
10 . . . substrate part
101 . . . cavity
11 . . . thin film-like part
12 . . . thermocouples
12c . . . cold junction
12h . . . hot junction
121 . . . first wire
122 . . . second wire
13 . . . thermopile
15 . . . heater part
151 . . . heater main part
152 . . . heater outer peripheral part
16 . . . temperature sensor
17 . . . electrode pad
20 . . . through hole
W . . . average distance between heater part and hot junction

The invention claimed is:

1. A thermal flow sensor chip comprising: a substrate part; a film part provided on the substrate part; a heater part provided on the film part and extending in a first direction; and a pair of thermopiles provided on the film part and arranged opposite each other across the heater part, wherein the heater part is formed by doping silicon with an impurity that reduces electrical resistance, wherein, in each of the thermopiles: a silicon region is formed by doping silicon with an impurity that reduces electrical resistance; and a plurality of thermocouples are arrayed in the first direction, each thermocouple having a hot junction arranged closer to the heater part and a cold junction arranged farther away from the heater part, wherein a concentration of the impurity in a heater main part, including a lengthwise center of the heater part extending in the first direction, is lower than the concentration of the impurity in a heater outer peripheral part, the heater outer peripheral part being different from the heater main part and including a lengthwise end part of the heater part, and wherein the concentration of the impurity in the heater main part is the same as the concentration of the impurity in at least part of the silicon region of the thermopile.

2. The thermal flow sensor chip according to claim 1, wherein a type of the impurity is the same between the heater main part and the heater outer peripheral part.

3. The thermal flow sensor chip according to claim 2, wherein the impurity is at least one of phosphorus, arsenic, and boron.

4. The thermal flow sensor chip according to claim 1, wherein a boundary between the heater main part and the heater outer peripheral part is provided within a predetermined distance from a reference location, the reference location being a location where a straight line that extends in a second direction from an end part of the thermopile in the first direction intersects the heater part, the first direction and the second direction being perpendicular to each other on a horizontal plane.

5. The thermal flow sensor chip according to claim 4, wherein the predetermined distance is the same as an average distance from the heater part to each hot junction.

6. The thermal flow sensor chip according to claim 1, wherein, in the silicon region of the thermopile, the concentration of the impurity varies between thermopile junction parts and thermopile wire parts, the thermopile junction parts including the hot junction and the cold junction, and the thermopile wire parts being different from the thermopile junction parts and including a wiring region between the hot junction and the cold junction, and wherein the concentration of the impurity in the heater main part is the same as the concentration of the impurity in the thermopile junction parts.

7. The thermal flow sensor chip according to claim 6, wherein the concentration of the impurity in the heater outer peripheral part is the same as the concentration of the impurity in the thermopile wire parts.

8. The thermal flow sensor chip according to claim 1,
wherein, in the silicon region of the thermopile, the concentration of the impurity varies between thermopile junction parts and thermopile wire parts, the thermopile junction parts including the hot junction and the cold junction, and the thermopile wire parts being different from the thermopile junction parts and including a wiring region between the hot junction and the cold junction, and
wherein the concentration of the impurity in the heater main part is same as the concentration of the impurity in the thermopile wire parts.

9. The thermal flow sensor chip according to claim 8, wherein the concentration of the impurity in the heater outer peripheral part is same as the concentration of the impurity in the thermopile junction parts.

10. The thermal flow sensor chip according to claim 1, wherein the concentration of the impurity in the heater outer peripheral part is at least three times the concentration of the impurity in the heater main part.

* * * * *